United States Patent [19]

Maycock et al.

[11] Patent Number: 4,632,237
[45] Date of Patent: Dec. 30, 1986

[54] FRICTION CLUTCH FOR A VEHICLE

[75] Inventors: Ian C. Maycock; Derek Hodgson, both of Leamington Spa, England

[73] Assignee: Automotive Products plc, Leamington Spa, England

[21] Appl. No.: 552,257

[22] Filed: Nov. 16, 1983

[30] Foreign Application Priority Data

Nov. 19, 1982 [GB] United Kingdom ............... 8233091

[51] Int. Cl.⁴ .................... F16D 19/00; F16D 21/00
[52] U.S. Cl. .................................. 192/98; 192/89 B; 192/70.13; 192/101
[58] Field of Search ............... 192/98, 70.13, 101, 192/89 B, 82 R; 285/307

[56] References Cited

U.S. PATENT DOCUMENTS

| | | | |
|---|---|---|---|
| 3,887,222 | 6/1975 | Hammond | 285/307 |
| 4,228,882 | 10/1980 | Huber | 192/98 |
| 4,352,419 | 10/1982 | Olschewski | 192/98 |
| 4,529,075 | 7/1985 | Renaud | 192/98 |

FOREIGN PATENT DOCUMENTS

| | | | |
|---|---|---|---|
| 3113463 | 12/1982 | Fed. Rep. of Germany | 192/98 |
| 628119 | 2/1982 | Switzerland | 192/98 |
| 963215 | 7/1964 | United Kingdom . | |
| 2033463 | 5/1980 | United Kingdom . | |

Primary Examiner—Ronald B. Cox
Attorney, Agent, or Firm—Solon B. Kemon

[57] ABSTRACT

The clutch comprises a clutch plate which can be retracted by a release mechanism to release a driven plate. The release mechanism includes first and second members and an intermediate detent. The detent is located between the members by urging the first member in one direction relative to the second member. To separate the first and second members, the first member is initially urged further in said one direction to release the detent.

13 Claims, 15 Drawing Figures

FRICTION CLUTCH FOR A VEHICLE

The invention relates to a friction clutch for a vehicle.

Figure 1:
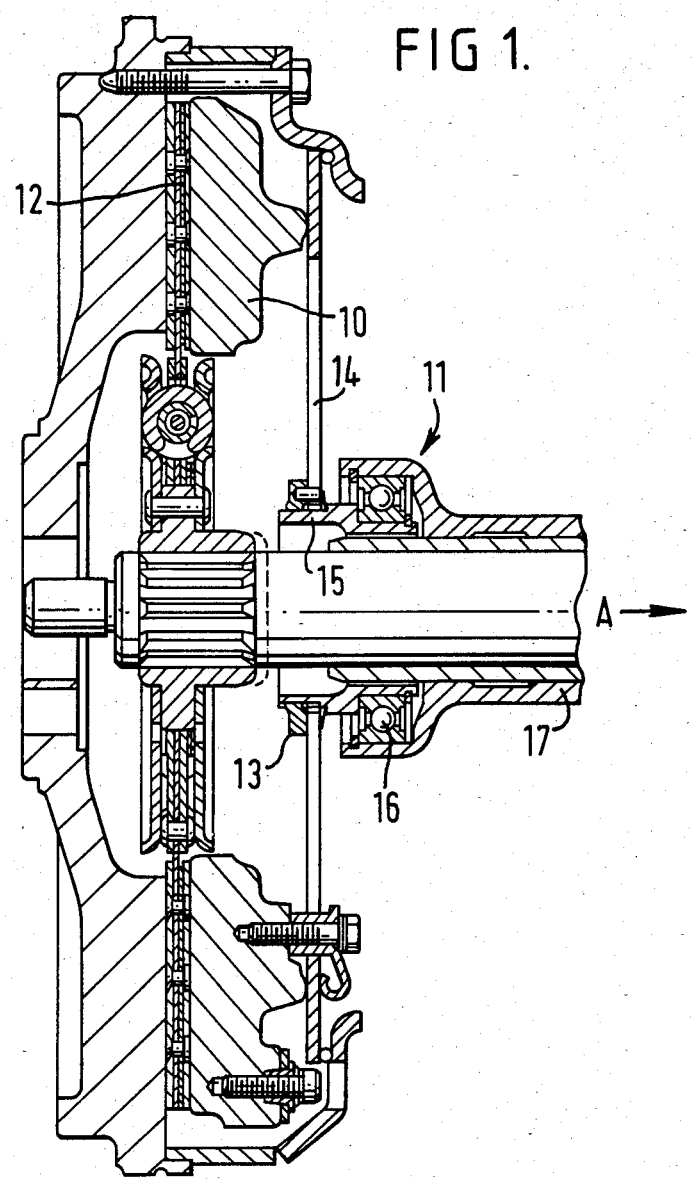

Various types of clutches for motor vehicles have been proposed over the years. FIG. 1 of the accompanying drawings illustrates a typical clutch arrangement where a clutch pressure plate 10 is retracted by a clutch release mechanism 11 to release the clutch driven plate 12. Clutch release is effected by applying a force in direction A to the hub 13 of a clutch spring 14 through a short hollow shaft 15, clutch release bearing 16 and a clutch release member 17. The releasing force is applied by means of a release fork (not shown) which engages the clutch release member 17.

On certain vehicles, assembly of the clutch release mechanism is made easier if clutch release components can be located, e.g. snap-fitted, on the spring hub 12 by a simple axial movement of the release member 17 in the opposite direction to A. Such a clutch release mechanism is the subject of Swiss Pat. No. 628119. However, such snap-fitting can pose a problem when dismantling the clutch because some way has to be found of disconnecting the release member from the spring hub. With the release mechanism described in the above Swiss Patent it is necessary to apply a force to the release member which is considerably greater than the usual clutch release force and which is applied in the same direction as the latter. However, there is always a risk with such an arrangement that fast clutch kickdown or abnormal resistance to clutch release may lead to the separation of the release member and spring hub rendering the vehicle impossible to drive. An object of the present invention is to provide a friction clutch having a release mechanism which will assist in overcoming that problem.

According to one aspect of the invention there is provided a friction clutch for a vehicle comprising a first member, a second member and a detent arranged to locate the first member relative to the second member by moving the first member in one direction relative to the second member whereby a clutch release force subsequently applied to said first member in an opposite direction will be transmitted to said second member to release the clutch, characterized in that detent release means is provided which enables the detent to be released by urging said first member further in said one direction relative to said second member so that the first and second members can thereafter be separated.

By using such a release mechanism, the clutch release force is applied in a direction which is opposite to the direction of the detent release force and so fast clutch kickdown or abnormal resistance to clutch release cannot result in accidental detent release leading to separation of the first and second members. In practice, the first member is preferably connected through a release bearing to the clutch release member and the second member is preferably the spring hub.

The detent release means may conveniently be provided on one of said first and second members. The release means may comprise an element mounted on one of the first and second members, the detent being arranged to engage said element when the first member is urged further in said one direction.

In one embodiment the first member locates in a bore in the second member, said detent is carried by one of the members and includes resilient catch means which locates in a recess in the other member, and said element is positioned in the bore and holds the catch means clear of the recess as a result of urging the first member further in said one direction and which then allows the first member to be withdrawn from the bore together with said element. The detent may conveniently be located in a recess in the first member. Preferably the detent is ring-like and is formed with axial slots, an inclined portion being defined between two said axial slots to form said catch means. In this embodiment the element may be a ring carried by a second member the bore of which ring receives the detent when the first member is urged further in said one direction so that the catch member disengages the recess in the second member and moves into the bore of the ring. The ring may be formed from a strip of metal which is bent into ring like form with its ends adjacent each other. The ring is then effectively a split-type which facilitates assembly into the recess in, say the first member.

In another embodiment, the first member locates in a bore in the second member, said detent is resilient and is mounted on the second member so as to locate in a recess in the first member, and said element comprises a ring on the first member which is arranged to urge the detent clear of the recess when the first member is moved further in said one direction and which then allows the first member to be withdrawn from the bore leaving the element inside the bore in engagement with the detent.

In a further embodiment, the second member locates within a bore in the first member and said detent is resilient and locates in a first recess within the bore by urging the first member in said one direction by a distance determined by spacer means, said detent release means comprising a further recess in the bore and said spacer means being deformable by urging the first member further in said one direction to enable the detent to enter said second recess clear of the second member so that the first and second members can thereafter be separated.

According to another aspect of the invention there is provided a method of locating a first member of a vehicle friction clutch release mechanism relative to a second member of the mechanism to enable clutch release forces to be transmitted from the first member to the second member, and subsequently separating said members, the method comprising moving the first member in one direction relative to the second member to effect said location and subsequently effecting further movement of said first member to enable the members to be separated, characterized in that said further movement of the first member is initially in said one direction relative to the second member.

Figure 2:
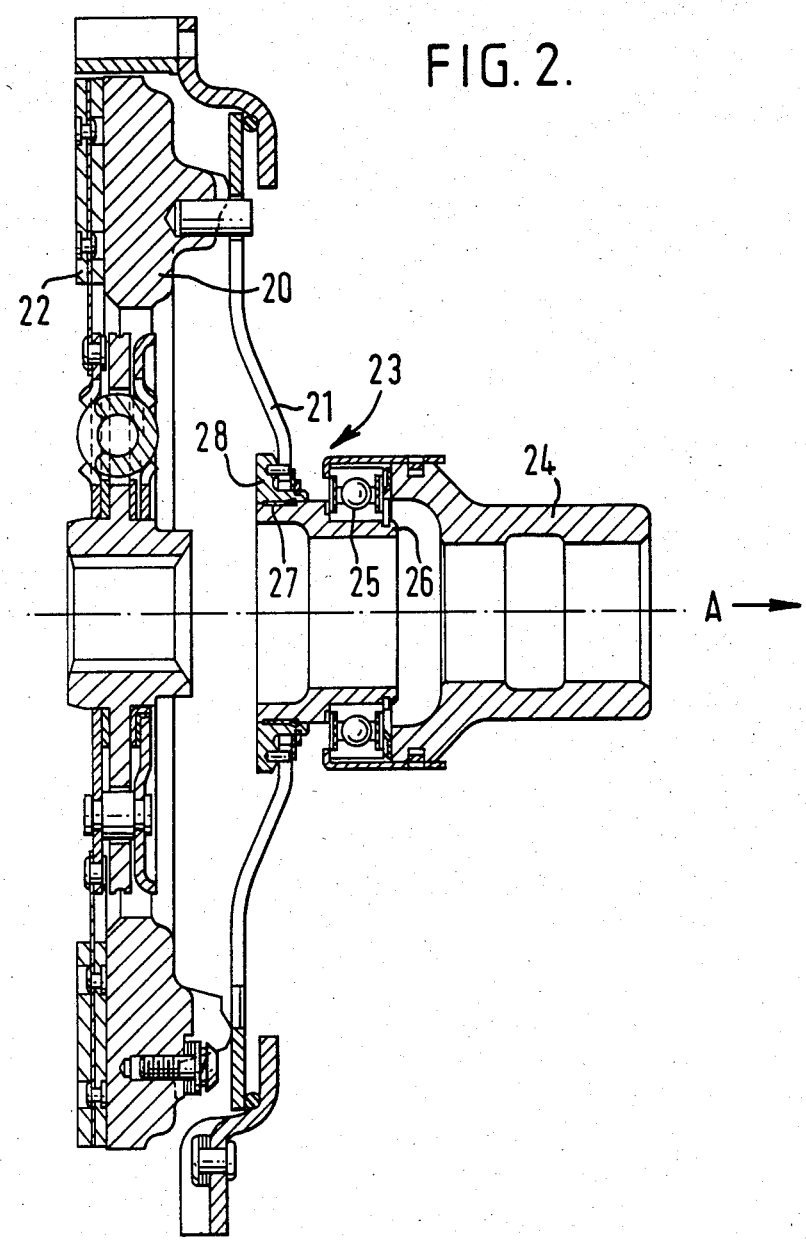
Figure 3:
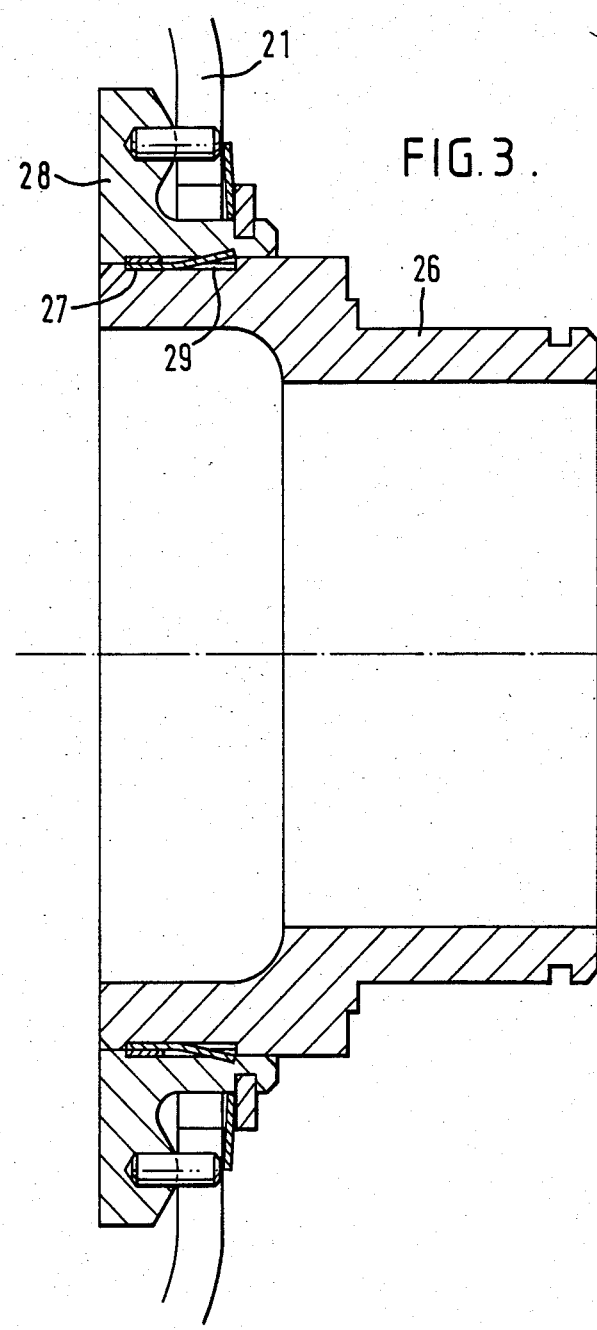
Figure 4:
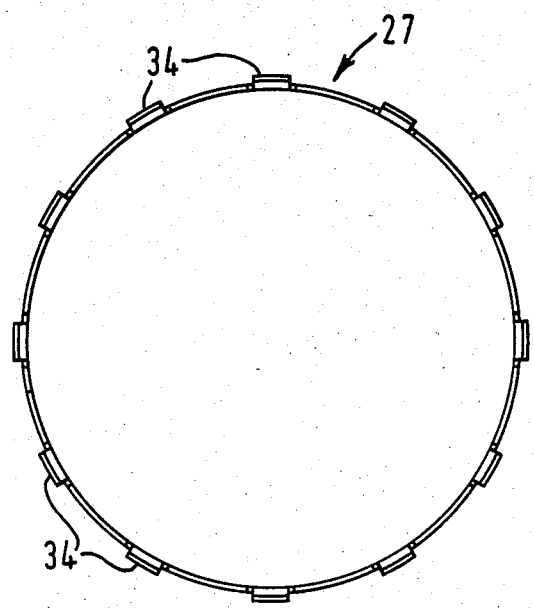
Figure 5:
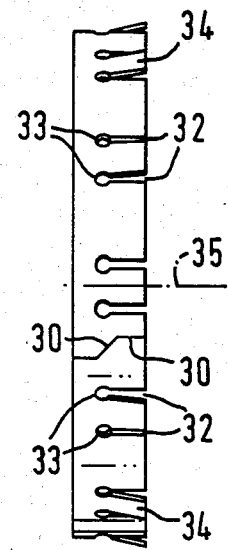
Figure 6:
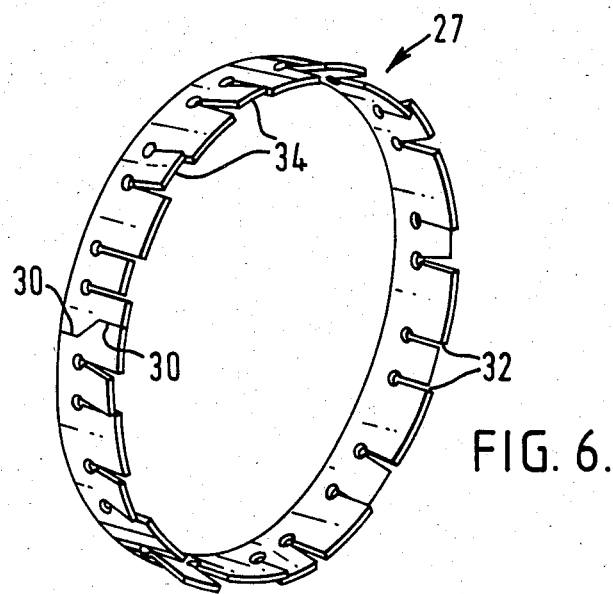
Figure 7:
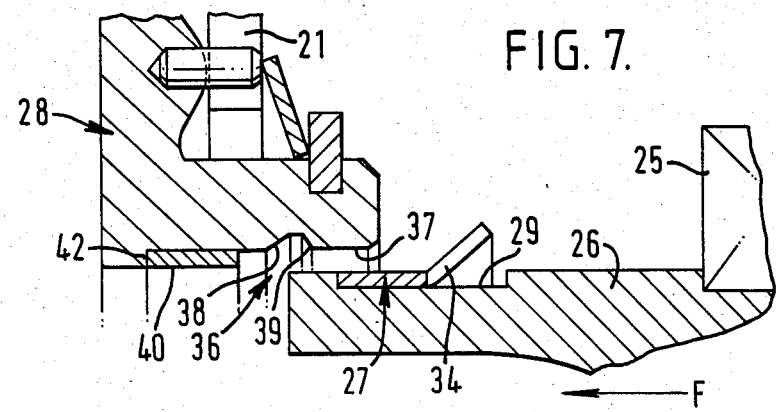
Figure 8:
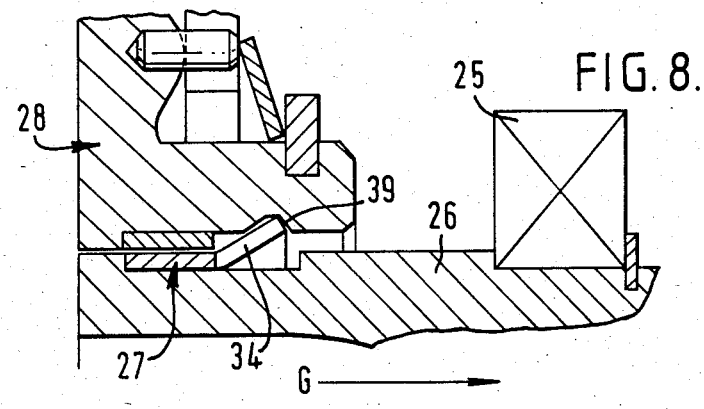
Figure 9:
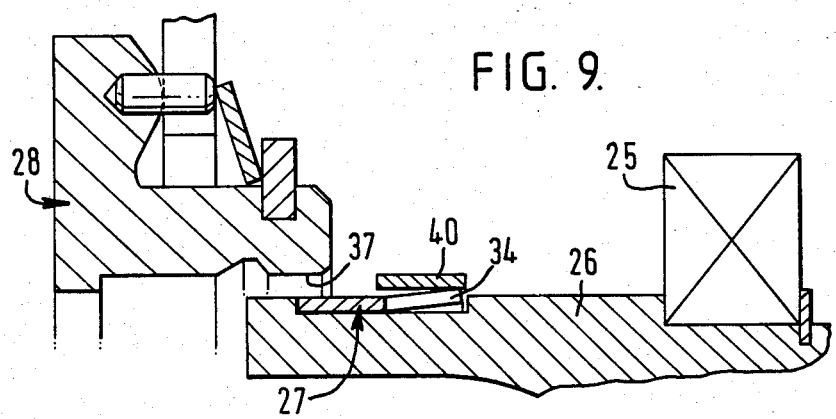
Figure 10:
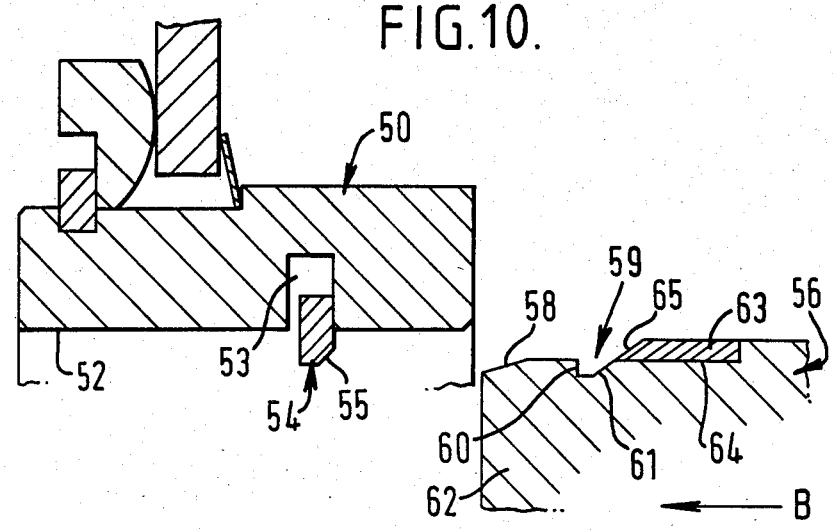
Figure 11:
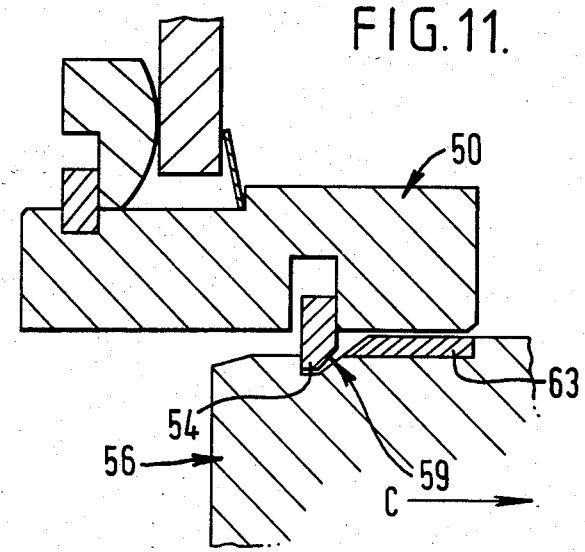
Figure 12:
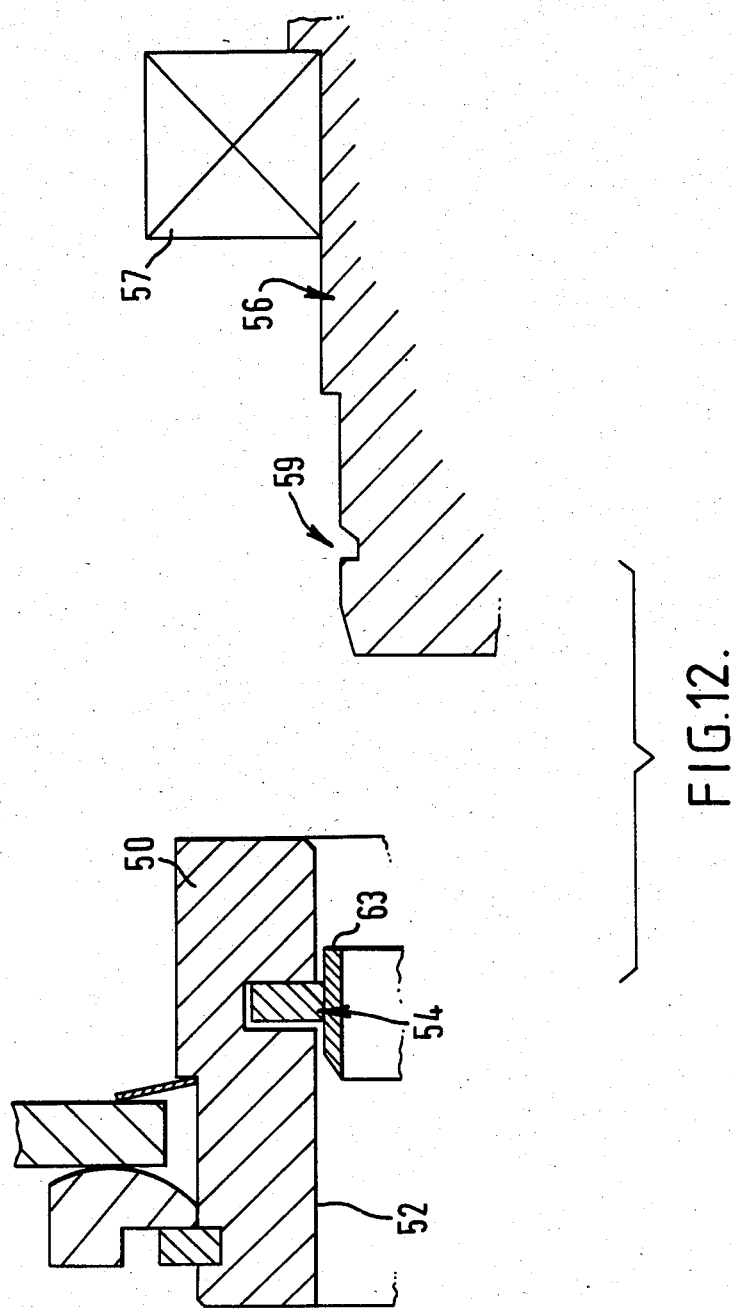
Figure 13:
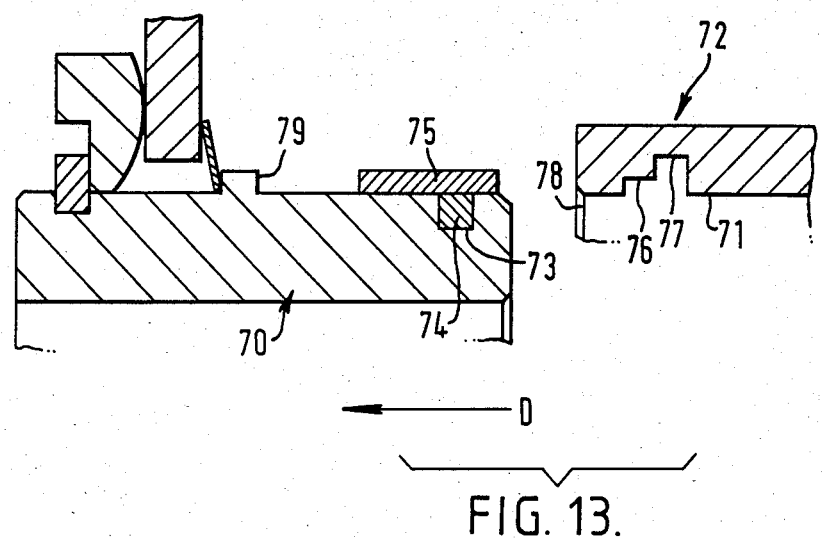
Figure 14:
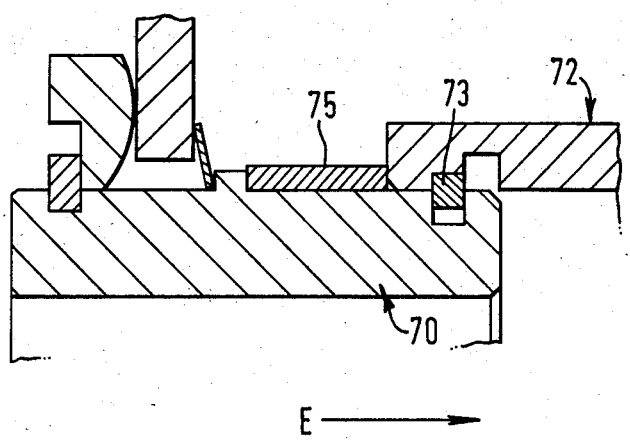
Figure 15:
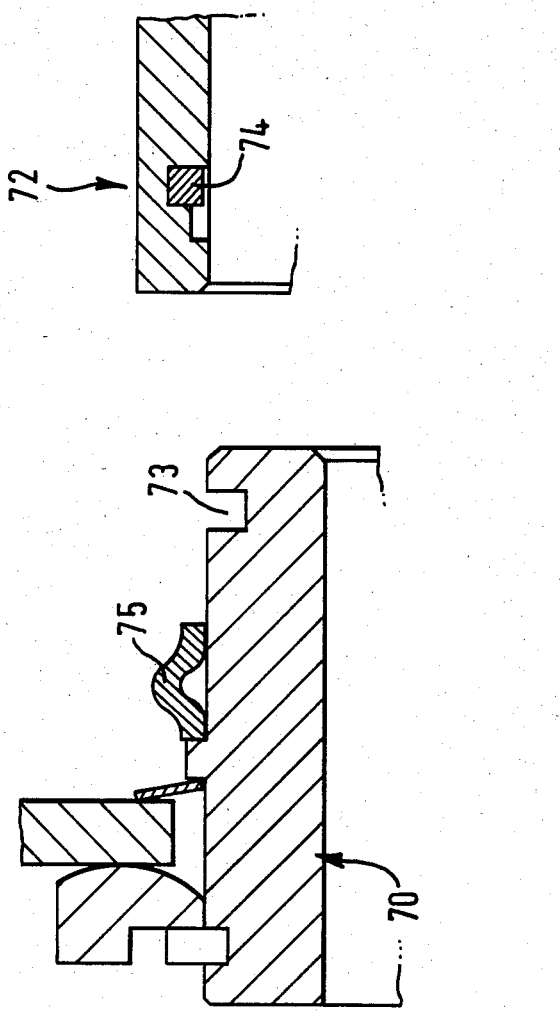

Friction clutches in accordance with the invention will now be described by way of example with reference to the remaining accompanying drawings in which:

FIG. 1 shows a prior art clutch,

FIG. 2 is a cross section of one form of friction clutch in accordance with the invention, FIG. 3 is an enlarged view of part of the release mechanism of the friction clutch of FIG. 2, FIGS. 4 and 5 are respectively end and side elevations of a detent ring for use in the release mechanism of the clutch of FIG. 2, FIG. 6 is a perspective view of the ring shown in FIGS. 4 and 5, FIGS. 7 and 8 are views of the clutch release mechanism for the clutch of FIG. 2 in assembly and operational positions respectively, FIG. 9 illustrates the way in which the clutch release mechanism of FIGS. 7 and 8 is dismantled, FIGS. 10 and 11 illustrate another clutch release mechanism of a friction clutch in accordance with the invention in assembly and operational positions respectively, FIG. 12 illustrates the way in which the clutch release mechanism of FIGS. 10 and 11 is dismantled, FIGS. 13 and 14 illustrate a further clutch release mechanism of a friction clutch in accordance with the invention in assembly and operational positions respectively, and FIG. 15 illustrates the way in which the clutch release mechanism of FIGS. 13 and 14 is dismantled.

In FIG. 2, the clutch pressure plate 20 is retracted to release the clutch driven plate 22 by means of a clutch release mechanism indicated generally at 23. A release force applied in the direction of arrow A to clutch release member 24 is transmitted through bearing 25, a short hollow shaft 26 and a detent ring 27 to a hub 28 of a clutch spring 21. As shown clearly in FIGS. 3 to 9 the shaft 26 is formed with a peripheral groove 29 in which the detent ring 27 is located. The ring 27 is formed from a strip of steel which has complementary step-like ends 30 and which is bent into circular form as a split-ring. The split-ring arrangement facilitates easily assembly into groove 29. The ring is formed with twelve pairs of axial slits 32 which terminate at stress-relieving apertures 33. A section of material between each pair of slits 32 is bent outwardly to form twelve catch members 34 inclined to the axis 35 of the ring 27. As shown clearly in FIG. 7 the spring hub 28 is tubular and has a V-shaped groove 36 formed in its internal bore 37. The left and right hand walls 38, 39 respectively of groove 36 are mutually inclined at 90°, but the wall 39 is inclined at a greater angle to the hub axis than wall 38. A ring 40 is slidably located in the bore 37 and abuts a shoulder 42. In use, the shaft 26 is inserted in bore 37 and is moved axially in direction F. Such movement causes catch members 34 to move inwardly toward the recess 29 until they are free to snap outwardly into the groove 36. A clutch release force in direction G can then be transmitted to the hub through the catch members which abut groove wall 39.

To separate the release member and hub, the shaft 26 is moved further in direction F so that the catch members 34 are urged inwardly towards the recess 29 by the right hand end of ring 40. The movement in direction F is continued until the release bearing 25 on the shaft 26 abuts the spring hub 28. In that position the catch members 34 will be contained within the ring 40 and the shaft 26 complete with ring 40 can be withdrawn from the bore 37 as shown in FIG. 9. The ring 40 can then be recovered for reassembly.

Referring now to FIGS. 10 to 12, the spring hub 50 has an internal bore 52 formed with a peripheral groove 53. The groove 53 houses a spring ring 54 having a chamfered edge 55. A shaft 56 equivalent to shaft 26 carries a clutch release bearing 57 (FIG. 12). The left hand end of the shaft 56 is formed with a chamfer 58 for engagement with the chamfer 55 of the spring ring 54 as described below. A peripheral groove 59 having a vertical side 60 and a frusto conical side 61 is formed in a reduced diameter left-hand section 62 of the shaft 56 and a cylindrical ring 63 locates slidably on a step portion 64 of the shaft. The outer diameter of the ring 63 is the same as that of the shaft 56 and the ring has a frusto conical left hand edge 65 adjacent groove side 61.

To assemble the shaft 56 and spring hub 50, the shaft 56 is moved in the direction of arrow B into the bore 52 so that the spring ring 54 rides up chamfer 58 and snaps into the groove 59 as in FIG. 11. A clutch release force applied to the shaft 56 in the direction of arrow C causes the side 60 of groove 59 to engage the non-chamfered side of the spring ring 54 and thereby release the clutch.

To enable the shaft 56 and spring hub 50 to be separated, the shaft 56 is urged in the direction of arrow B again so that the shaft 56 moves to the left and the spring ring 54 rides up the groove side 61 and the left hand edge of ring 65 until it rests on and grips the outer surface of the ring as shown in FIG. 12. The shaft 56 can then simply be withdrawn through the ring 63 leaving the latter in the bore 52. The ring 63 can then easily be recovered from the bore for re-use on assembly.

In FIGS. 13 to 15 the spring hub 70 fits into a bore 71 in a shaft 72 (equivalent to shaft 26 of FIG. 2) which is fast with the inner race of a clutch release bearing (not shown). The outer surface of the spring hub 70 is formed with a circumferential groove 73 housing a spring ring 74. The spring ring 74 is biased so as normally to be of greater internal diameter than the spring hub 70 as shown in FIG. 15 and in FIG. 13 is held fully in the groove 73 by an expanded metal sleeve 75. The shaft 72 has a first groove 76 in its inner periphery and an adjacent second and deeper groove 77. The left hand end of the bore 71 is chamfered at 78.

To assemble the hub and shaft, the shaft 72 is moved on to the hub 70 in direction D so that the left hand end of the shaft 72 pushes the expanded metal sleeve 75 along the hub 70 until it engages a shoulder 79. As that position is reached the spring ring 74 snaps outwards in groove 76 as in FIG. 14, the expanded metal tube acting as a stop to inhibit further movement in direction D. Once the spring ring locates in the groove 76, clutch release forces (direction E) can be transmitted from the shaft 72 to the spring hub 70.

To separate the shaft and hub, a force sufficient to collapse the expanded metal tube is applied in the D direction to the shaft 72 so that the latter can move leftwards sufficiently for the spring ring 74 to move out of the groove 73 entirely and snap into the groove 77. The shaft 72 can then be disengaged from the hub 70. The spring ring 74 can be recovered for reassembly and the collapsed expanded metal tube replaced by a new one.

The groove 76 may be axially longer than the thickness of the spring ring to minimise the risk of the ring slipping into the groove 77 if a force sufficient to compress the sleeve 75 slightly is applied during assembly. For the same reason a small internal shoulder may be provided between the two grooves over which the spring ring 74 must ride before it can locate in the groove 77.

It is envisaged that a helical compression spring may be used in place of the sleeve 75. In such a case the compression spring will be re-usable on reassembly.

Whilst in FIGS. 2 to 9 the detent is carried by the shaft 26 for engagement with recess 36 in the spring hub 28, the detent could be carried by the spring hub for engagement in a recess in the shaft 26. Similarly the detent arrangement in FIGS. 10–12 and 13–15 could be varied so that each detent is carried by the shaft for engagement in a groove in the spring hub.

What we claim as our invention and desire to secure by Letters Patent in the United States is:

1. A friction clutch for a vehicle which includes a clutch release mechanism comprising a first member, a second member, a detent arranged to locate the first member relative to the second member by moving the first member in one direction relative to the second member whereby a clutch release force subsequently applied to said first member in an opposite direction will be transmitted to said second member to release the clutch, and detent release means which enables the detent to be released by initially urging said first member further in said one direction relative to said second member so that the first and second members can thereafter be separated by subsequently moving said first member in said opposite direction relative to the second member, said detent release means remaining with said detent upon separation of said first and second members.

2. A friction clutch for a vehicle which includes a clutch release mechanism comprising a first member, a second member, a detent arranged to locate the first member, relative to the second member by moving the first member in one direction relative to the second member whereby a clutch release force subsequently applied to said first member in an opposite direction will be transmitted to said second member to release the clutch, and detent release means which enables the detent to be released by urging said first member further in said one direction relative to said second member so that the first and second members can thereafter be separated, the first member being located in a bore in the second member, and said detent being carried by one of the members and including resilient catch means which locates in a recess in the other member, an element being positioned in the bore on one of the first and second members so as to engage and hold the catch means clear of the recess as a result of urging the first member further in said one direction and which then allows the first member to be withdrawn from the bore together with said element.

3. A friction clutch for a vehicle which includes a clutch release mechanism comprising a first member, a second member, a detent arranged to locate the first member relative to the second member by moving the first member in one direction relative to the second member whereby a clutch release force subsequently applied to said first member in an opposite direction will be transmitted to said second member to release the clutch, and detent release means which enables the detent to be released by urging said first member further in said one direction relative to said second member so that the first and second members can thereafter be separated, said detent including resilient catch means carried by one of the members and which locates in a recess in the other member, and said detent release means comprising an element arranged to hold the catch means clear of the recess as a result of urging the first member further in said one direction, and which then allows the members to be separated with one of said members carrying the interengaged element and catch means.

4. A friction clutch according to claim 1 in which said detent release means is provided on one of said first and second members.

5. A friction clutch according to claim 1 in which the release means comprises an element mounted on one of the first and second members and the detent is arranged to engage said element when the first member is urged further in said one direction whereby the detent is retained in a released condition during said subsequent movement of said first member in said opposite direction relative to said second member.

6. A friction clutch according to claim 2 in which the detent is ring like and is formed with axial slots, an inclined portion being defined between two said axial slots to form said catch means.

7. A friction clutch according to claim 6 in which said element is a ring carried by the second member the bore of which ring receives the detent when the first member is urged further in said one direction so that the catch member disengages the recess in the second member and moves into the bore of the ring.

8. A friction clutch according to claim 5 in which the first member locates in a bore in the second member, said detent is resilient and is mounted on the second member so as to locate in a recess in the first member, and said element comprises a ring on the first member which is arranged to urge the detent clear of the recess when the first member is moved further in said one direction and which then allows the first member to be withdrawn from the bore leaving the element inside the bore in engagement with the detent.

9. A friction clutch according to claim 1 in which the second member locates within a bore in the first member and said detent is resilient and locates in a first recess within the bore by urging the first member in said one direction by a distance determined by spacer means, said detent release means comprising a further recess in the bore and said spacer means being deformable by urging the first member further in said one direction to enable the detent to enter said second recess clear of the second member so that the first and second members can thereafter be separated.

10. A friction clutch according to claim 9 in which the deformable spacer means comprises an expanded metal tube on the second member which is collapsible to allow the first member to be moved further in said one direction.

11. A friction clutch according to claim 3 in which the detent is ring like and is formed with axial slots, an inclined portion being defined between two said axial slots to form said catch means.

12. A friction clutch according to claim 11 in which said element is a ring carried by the second member the bore of which ring receives the detent when the first member is urged further in said one direction so that the catch member disengages the recess in the second member and moves into the bore of the ring.

13. A friction clutch according to claim 1 in which the release means comprises an element mounted on one of the first and second members and the detent is arranged to engage said element when the first member is urged further in said one direction whereby during said subsequent movement of said first member in said opposite direction relative axial movement takes place between said element and the member on which it is mounted.

* * * * *